United States Patent [19]

Yang

[11] Patent Number: 5,181,287
[45] Date of Patent: Jan. 26, 1993

[54] HEAT-VENTING INSULATING ARTICLE

[76] Inventor: Jun-Jie Yang, No. 65, Lane 566, Min-Shern South Road, Chia-Yi City, Taiwan

[21] Appl. No.: 853,617

[22] Filed: Mar. 18, 1992

[51] Int. Cl.⁵ ............................................. A47C 9/02
[52] U.S. Cl. .................................... 5/482; 5/486; 5/502; 5/421; 236/93 R
[58] Field of Search ............... 5/421, 468, 482, 486, 5/502; 236/93 R, 101 R; 2/DIG. 1

[56] References Cited

U.S. PATENT DOCUMENTS

| | | | |
|---|---|---|---|
| 2,673,687 | 3/1954 | Alban et al. | 236/93 R |
| 2,763,433 | 9/1956 | Hill | 236/93 R |
| 2,808,596 | 10/1957 | Schreiner | 5/486 |
| 3,696,450 | 10/1972 | Dupler | 5/406 |
| 4,270,227 | 6/1981 | Wolfe | 2/DIG. 1 X |
| 4,509,499 | 4/1985 | Hebert | 263/93 R X |
| 4,576,087 | 3/1986 | Wolfe | 2/DIG. 1 X |

FOREIGN PATENT DOCUMENTS

| | | | |
|---|---|---|---|
| 859071 | 1/1961 | United Kingdom | 5/482 |
| 2198940 | 6/1988 | United Kingdom | 5/486 |

*Primary Examiner*—Michael F. Trettel
*Attorney, Agent, or Firm*—Larson and Taylor

[57] ABSTRACT

A heat-venting insulating article such as a garment, quilt, blanket, or the like, has an intermediate heat-insulating layer provided with a plurality of through holes. Inserted into each hole is a heat-venting ring capable of opening or closing in response to rising or falling temperatures within the insulating article so as to retain heat or to let excessive heat escape.

1 Claim, 2 Drawing Sheets

HEAT-VENTING INSULATING ARTICLE

BACKGROUND OF THE INVENTION

A conventional insulating article such as a quilt, a blanket, a thick garment, or the like, hereafter referred to as an insulating covering, generally keeps a person using it warm in cold weather, but when it becomes too warm, the person generally has to take the covering off, or if the covering is a quilt, a person being covered with the quilt may kick it off his body while sleeping without knowing it when it becomes too warm. A young child may sometimes not be able to express when he feels too warm or is sweating in a thick garment.

SUMMARY OF THE INVENTION

This invention provides a heat-passing or heat-venting, insulating article, which has an intermediate heat-insulating layer provided with a plurality of through holes. A heat-venting ring, fitted in each of the through holes in the heat-insulating layer, has a separating layer in its interior. The separating layer can be closed or opened responsive to arise or fall in the temperature in the insulating article to retain the body heat of a user or to let a part of body heat escape through the rings so that the insulating article does not become too warm or too cold as regulated by the automatic movement of the separating layers in the rings.

The separating layer in each ring comprises two semi-circular petals of flexible material and a U-shaped metal pin, like a hair-pin inserted into a pin hole in each of two petals. Expansion and contraction of the metal pin caused by a change of the temperature in the insulating article can open or close the two petals.

BRIEF DESCRIPTION OF DRAWINGS

This invention will now be described in detail with reference to accompanying drawings wherein.

DETAILED DESCRIPTION OF THE INVENTION

Figure 1:
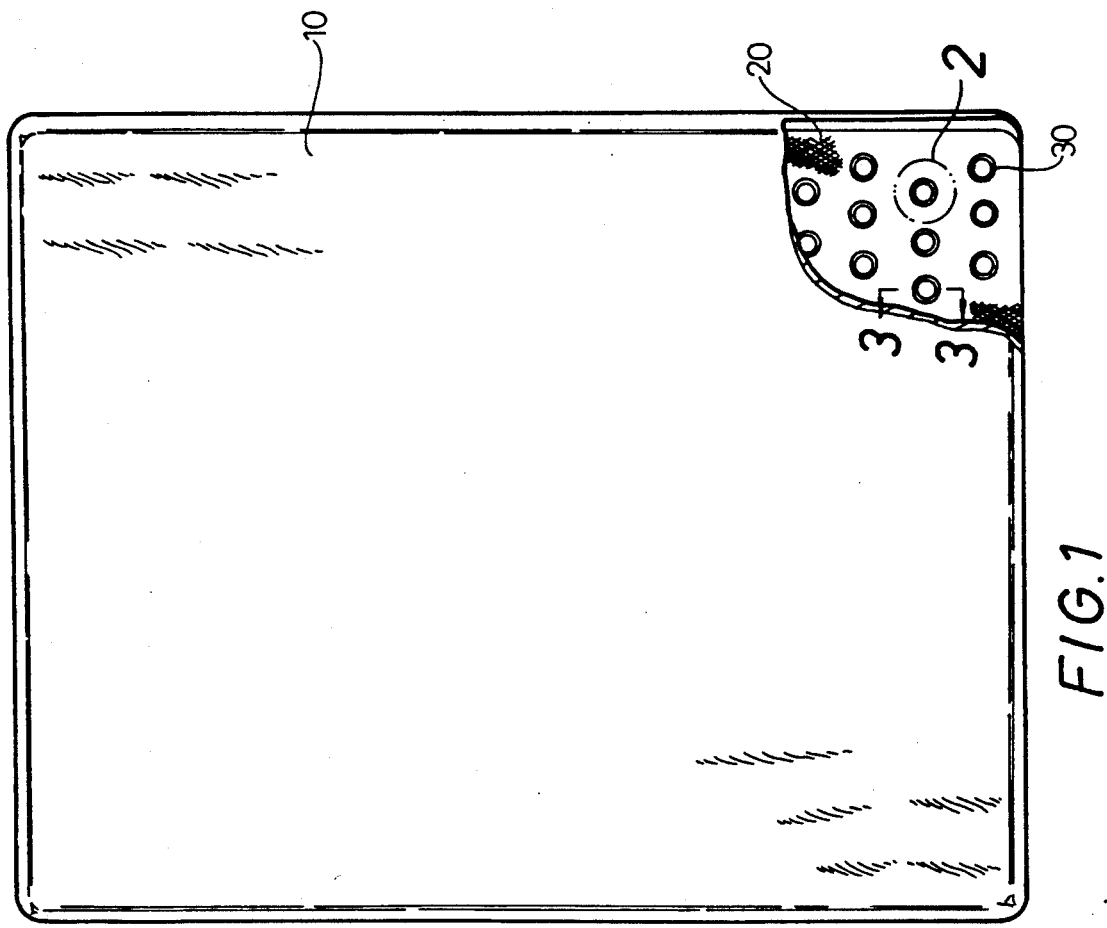
FIG. 1 is an upper view of a heat-venting insulating article in accordance with the present invention.

A heat-venting insulating article 10 in accordance with the present invention, as shown in FIG. 1, comprises an intermediate heat-insulating layer 20 provided with a plurality of through holes (not separately shown in the drawings), and a plurality of heat-escapable rings 30 fitted in the through holes.

Figure 2:
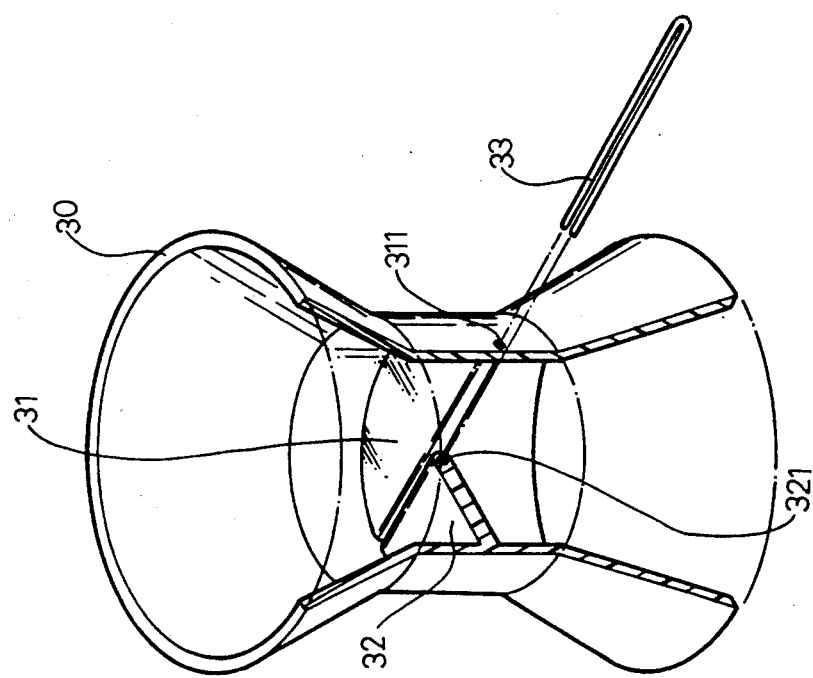
FIG. 2 is a perspective view of a heat-venting ring of a heat-venting insulating article in accordance with the present invention.

The main feature of the present invention is the structure of the heat-escapable ring 30 shown in FIG. 2. The ring 30 is made of a soft flexible material such as rubber, and can be so as to be round, square, etc., having an intermediate smaller sized portion than both end portions in order to fit around the corresponding through hole in the heat-insulating layer 20.

Figure 4:
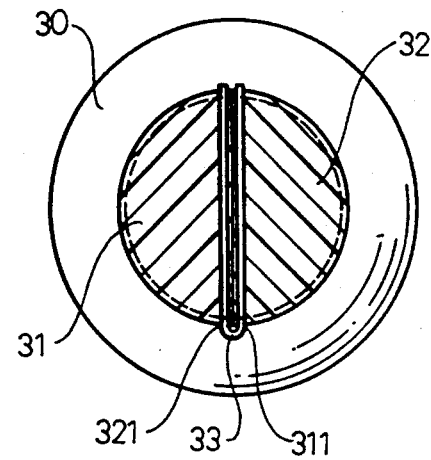
FIG. 4 is a cross-sectional view taken along line 4—4 of FIG. 3.
Figure 6:
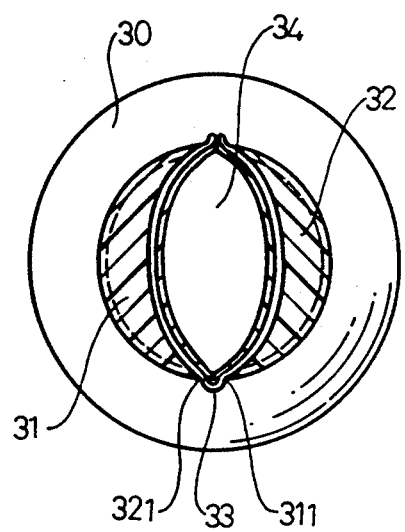
FIG. 6 is a cross-sectional view taken along line 6—6 of FIG. 5.

The heat-venting ring 30 has a horizontal separating layer comprising two semi-circular petals 31, 32 which are not connected with each other but contact with each other. The petals 31, 32 have respective through pin holes 311, 321 near their diametrical edges so that a U-shaped metal pin 33, like a hair pin, may be inserted into through pin holes 311, 321. The metal pin 33 is made as a hair pin having a shape of a straight line in low temperature as shown in FIG. 4 but can expand to bend to push the two petals 31, 32 to both sides in high temperature conditions so as to form an oval opening in the central portion of the separating layer, as shown in FIG. 6.

Figure 3:
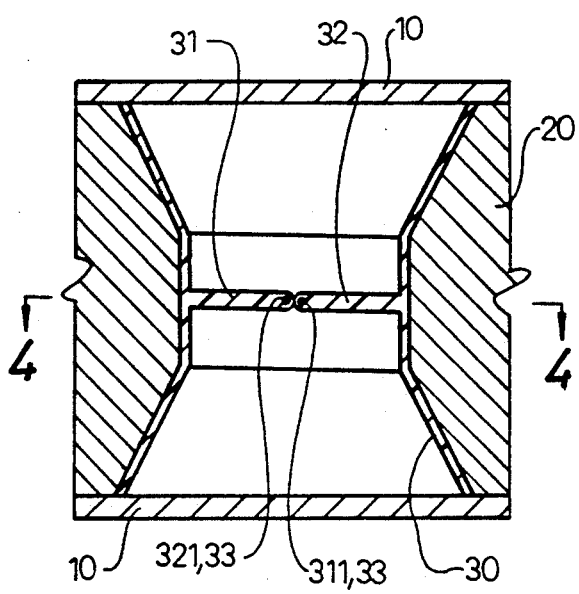
FIG. 3 is a side cross-sectional view of the heat-venting ring in the heat-venting insulating article in accordance with the present invention.

As shown in FIG. 3, when an insulating article equipped with the heat-venting rings 30 is initially used by or worn on a person, the metal pins 33 each still keep the original straight condition thereof until the pins 33 are subjected to a certain temperature high enough to expand the pins 33 and change their shape or form so that the pins to bend to both sides. The two petals 31, 32 are intially in contact with each other, or in a closed condition to prevent a user's body heat from escaping out of the insulating article 10, making the user feel warm.

Figure 5:
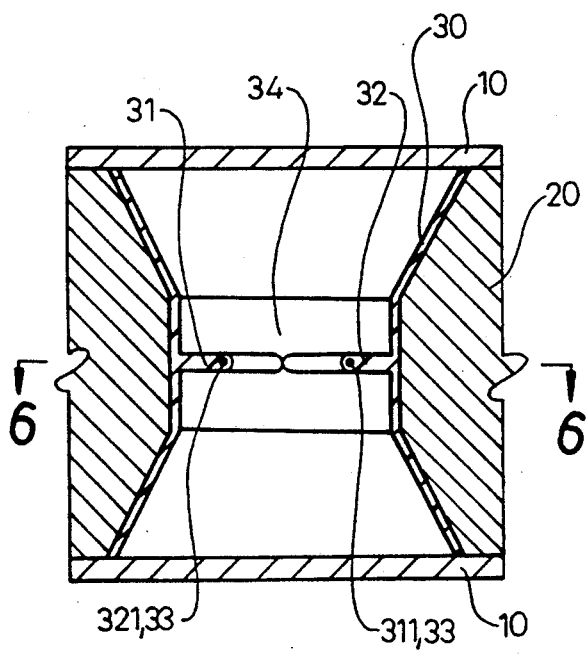
FIG. 5 is an view similar to FIG. 3 showing the open or heat-venting state.

Next, as shown in FIG. 5, each of the metal pins 33 will gradually expand to bend and push the two petals 31, 32 to both sides thereby forming an opening 34 in the central portion of the separating layer, when the person wearing the article 10 such as a garment, a quilt, a blanket, or the like, continues to give off body heat. When this happens a part of the heat in the article 10 can pass through the openings 34 formed in the ring 30 to escape out of the top surface of the article, lessening the temperature of the article so that the metal pins may contract or shrink gradually, hence letting the openings 34 become smaller and smaller so that the openings finally close up. So the heat-venting rings 30 expand or contract in proportion to the rise or fall of the temperature in the article 10, thereby keeping the article 10 at a proper temperature, i.e., not too warm and not too cold.

What is claimed is:

1. A heat-venting, insulating article including an intermediate heat-insulating layer provided with a plurality of through holes, and a heat-venting ring fitting in each of said through holes in said heat-insulating layer, each of said rings comprising an intermediate relatively small-sized portion between relatively large-sized end portions, said intermediate portion including a transverse separating layer comprising two semi-circular petals made of a soft flexible material and each including a diametrical edge, each of said petals being provided with a through pin hole in the diametrical edge thereof and said article further comprising a U-shaped metal pin having first and second legs inserted into respective through pin holes of said petals, each said metal pin being capable of expansion or contraction in response to a rise or fall in temperature, each said metal pin expanding to bend and push the two petals to both sides so as to form an opening between the two petals to let heat flow through when the metal pin is heated by body heat from a user of the article, and each said metal pin contracting to close the two petals when the metal pin cools off.

* * * * *